United States Patent
Puttaswamy Naga

(10) Patent No.: US 9,626,222 B2
(45) Date of Patent: Apr. 18, 2017

(54) METHOD AND APPARATUS FOR NETWORK AND STORAGE-AWARE VIRTUAL MACHINE PLACEMENT

(75) Inventor: Krishna P. Puttaswamy Naga, Metuchen, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 209 days.

(21) Appl. No.: 13/351,521

(22) Filed: Jan. 17, 2012

(65) Prior Publication Data
US 2013/0185414 A1    Jul. 18, 2013

(51) Int. Cl.
*G06F 15/173* (2006.01)
*G06F 9/50* (2006.01)
*H04L 29/08* (2006.01)

(52) U.S. Cl.
CPC ........... *G06F 9/5027* (2013.01); *H04L 67/16* (2013.01)

(58) Field of Classification Search
CPC ...... G06F 9/5077; G06F 3/067; G06F 3/0631; H04L 67/1097
See application file for complete search history.

(56) References Cited

U.S. PATENT DOCUMENTS

| | | | |
|---|---|---|---|
| 6,970,902 B1 * | 11/2005 | Moon | 709/201 |
| 7,296,267 B2 * | 11/2007 | Cota-Robles et al. | 718/1 |
| 8,095,662 B1 * | 1/2012 | Lappas et al. | 709/226 |
| 8,307,177 B2 * | 11/2012 | Prahlad et al. | 711/162 |
| 8,307,362 B1 * | 11/2012 | Gong et al. | 718/1 |
| 2010/0250744 A1 | 9/2010 | Hadad et al. | |
| 2010/0275198 A1 * | 10/2010 | Jess et al. | 718/1 |
| 2011/0004735 A1 | 1/2011 | Arroyo et al. | |
| 2011/0078679 A1 * | 3/2011 | Bozek et al. | 718/1 |
| 2011/0238775 A1 * | 9/2011 | Wu et al. | 709/213 |

FOREIGN PATENT DOCUMENTS

| | | |
|---|---|---|
| JP | 2009134687 A | 6/2009 |
| JP | 2009151745 A | 7/2009 |
| WO | 2010138130 | 12/2010 |
| WO | PCT/US2012/066754 | 4/2013 |

OTHER PUBLICATIONS

Patent Abstracts of Japan, available at JPO, Publication No. 2009-151745, published Jul. 9, 2009, 1 page, machine translation corresponding to JP2009151745A as cited in Foreign Patent Documents, Cite No. 1.

* cited by examiner

*Primary Examiner* — Esther B Henderson
(74) *Attorney, Agent, or Firm* — Kramer & Amado, P.C.

(57) ABSTRACT

Various embodiments provide a method and apparatus of providing a network and storage-aware virtual machine (VM) placement that optimizes placement based on network layer metrics, performance characteristics of the storage arrays and application constraints. Advantageously, since storage is often necessary in servicing application requests, basing VM placement on performance characteristics of the storage arrays as well as network layer metrics can lead to a significant improvement in VM performance.

25 Claims, 3 Drawing Sheets

METHOD AND APPARATUS FOR NETWORK AND STORAGE-AWARE VIRTUAL MACHINE PLACEMENT

TECHNICAL FIELD

The invention relates generally to methods and apparatus for providing placement of virtual machines in cloud networks.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known cloud networks, placement of virtual machines in a distributed cloud is based solely on optimizing network layer metrics. Network layer constraints such as network latency, network throughput, and network transfer cost are the most common metrics in this optimization.

SUMMARY

Various embodiments provide a method and apparatus of providing a network and storage-aware virtual machine (VM) placement that optimizes placement based on network layer metrics, performance characteristics of the storage arrays and application constraints. Advantageously, since storage is often necessary in servicing application requests, basing VM placement on performance characteristics of the storage arrays as well as network layer metrics can lead to a significant improvement in VM performance.

In one embodiment, an apparatus is provided for providing placement of a virtual machine in a cloud network. The apparatus includes a data storage, and a processor communicatively coupled to the data storage. The processor is programmed (i.e., configured) to: gather a first set of storage performance data representing the performance characteristics of one or more storage arrays in the cloud network, gather a second set of network performance data representing one or more network performance characteristics of the cloud network, and determine a placement location of the virtual machine in the cloud network based on the first set of storage performance data and the second set of network performance data.

In some embodiments, the apparatus further includes an I/O interface communicatively coupled to the processor. The processor is further programmed to: retrieve the first set of storage performance data via the I/O interface, and retrieve the second set of network performance data via the I/O interface.

In some embodiments, the retrieval of the first set of storage performance data includes communicating with at least one storage device of the one or more storage arrays via an API.

In some embodiments, the determination of the placement location is based on an optimization objective function and one or more constraints.

In some embodiments, the optimization objective function minimizes a latency output and/or a cost output.

In some embodiments, the optimization objective function is based on a weighted ranking of a plurality of objectives.

In some embodiments, the processor is further programmed to: gather a third set of application requirement data representing one or more application requirements of the virtual machine, and further base the determination of the placement location on the third set of application requirement data.

In some embodiments, the third set of application requirement data comprises a data access pattern.

In a second embodiment, a virtual machine placement system provides placement of a virtual machine in a cloud network. The system includes: a plurality of storage arrays, a plurality of resources; and a virtual machine placement apparatus communicatively coupled to the plurality of storage arrays and the plurality of resources. The virtual machine placement apparatus is programmed to: gather a first set of storage performance data representing the performance characteristics of the plurality of storage arrays, gather a second set of network performance data representing one or more network performance characteristics of the cloud network, and determine a virtual machine based on the first set of storage performance data and the second set of network performance data, the virtual machine comprising at least one of the plurality of storage arrays and at least one of the plurality of resources.

In some embodiments, the determination of the virtual machine is based on an optimization objective function and one or more constraints.

In some embodiments, the virtual machine placement apparatus is further programmed to: gather a third set of application requirement data representing one or more application requirements of the virtual machine, and further base the determination of the virtual machine on the third set of application requirement data.

In a third embodiment, a method is provided for placing a virtual machine in a cloud network. The method includes: gathering a first set of storage performance data representing the performance characteristics of one or more storage arrays in the cloud network a second set of network performance data representing one or more network performance characteristics of the cloud network, and determining a placement location of the virtual machine in the cloud network based on the first set of storage performance data and the second set of network performance data.

In some embodiments, the step of determining the placement location is based on an optimization objective function and one or more constraints.

In some embodiments, the method further includes: gathering a third set of application requirement data representing one or more application requirements of the virtual machine, and further basing the step of determining the placement location on the third set of application requirement data.

In some embodiments, the method further includes: further basing the step of determining the placement location on a reservation constraint.

In some embodiments, the method further includes: sending a client notification in response to determining that the placement location does not satisfy the one or more constraints of the optimization objective function.

BRIEF DESCRIPTION OF THE DRAWINGS

Various embodiments are illustrated in the accompanying drawings, in which.

To facilitate understanding, identical reference numerals have been used to designate elements having substantially the same or similar structure and/or substantially the same or similar function.

DETAILED DESCRIPTION OF ILLUSTRATIVE EMBODIMENTS

Various embodiments provide a method and apparatus of providing a network and storage-aware virtual machine (VM) placement that optimizes placement based on network layer metrics, performance characteristics of the storage arrays and application constraints. Advantageously, since storage is often necessary in servicing application requests, basing VM placement on performance characteristics of the storage arrays as well as network layer metrics can lead to a significant improvement in VM performance.

Figure 1:
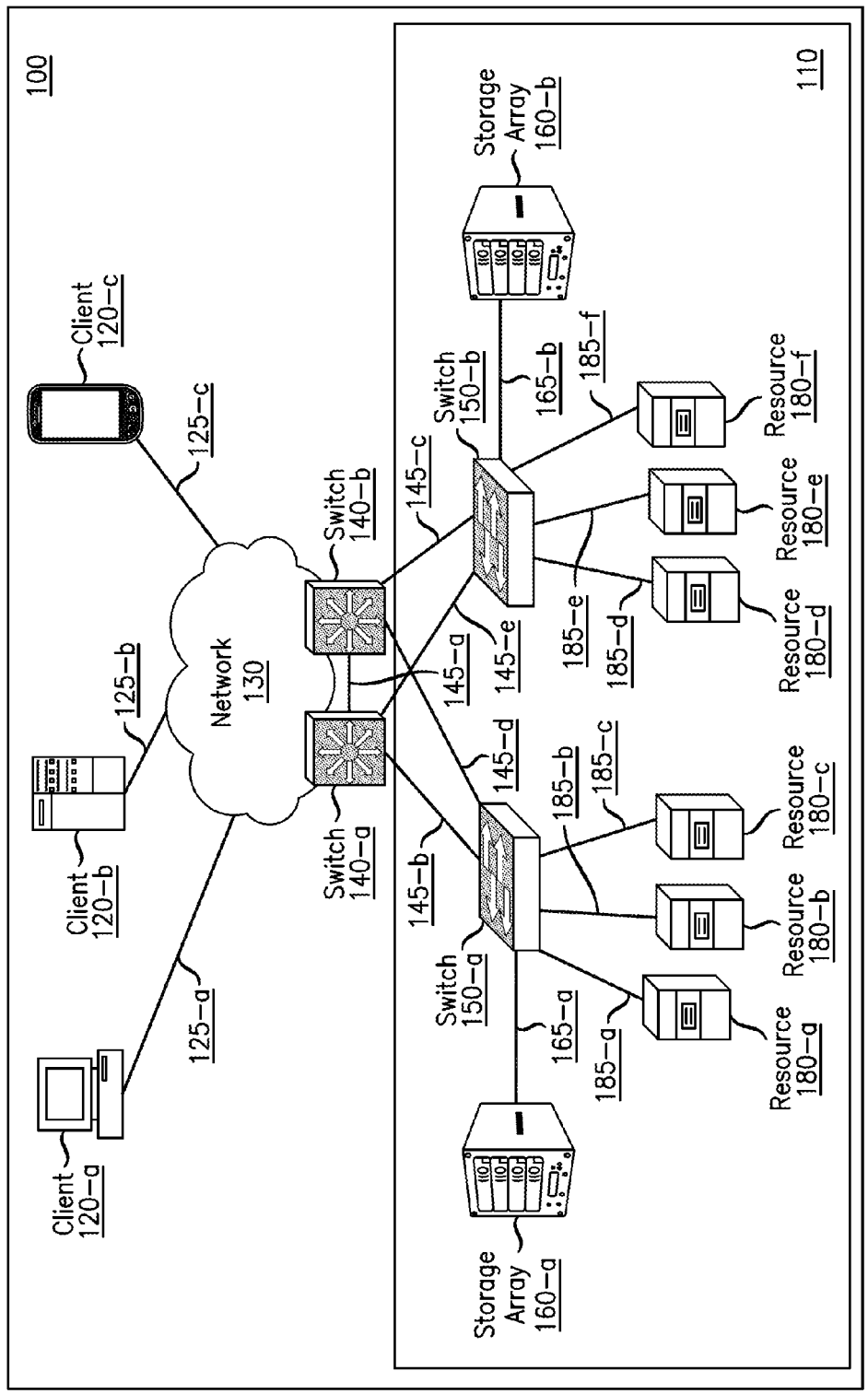
FIG. 1 illustrates a cloud network 100 that includes an embodiment of the virtual machine (VM) placement architecture 110.

FIG. 1 illustrates a cloud network 100 that includes an embodiment of the virtual machine (VM) placement architecture 110. The cloud network 100 includes one or more clients 120-a-120-c (collectively, clients 120) that send application requests to the virtual machines (VMs) instantiated in resources 180-a-180-f (collectively, resources 180) via a communication path. The communication path may include one of client communication channels 125-a, 125-b, and 125-c (collectively client communication channels 125), a network 130 including one or more edges switches 140-a and/or 140-b (collectively, edge switches 140), one of edge communications channels 145-a-145-e (collectively, edge communication channels 145), one or more local networks having one or more local switches 150-a and 150-b (collectively, local switches 150), and one of resource communication channels 185-a-185-f (collectively, resource communication channels 185). The communication path may also optionally one of storage communication channels 165-a or 165-b (collectively, storage communication channels 165) if the application request or response requires a data access operation of data stored in one of storage array 160-a or 160-b (collectively, storage arrays 160).

The clients 120 may be any type or number of client machine(s) initiating application request(s) directed to one of the virtual machines instantiated on resources 180. For example, a client may be: a server, a mobile phone, a tablet, a computer, a personal digital assistant (PDA), an e-reader, a network device (e.g., a switch or a router) and/or the like.

The communication channels 125, 145, 165 and 185 may support retrieving or responding to application requests over one or more communication channels such as: wireless communications (e.g., LTE, GSM, CDMA, bluetooth); femtocell communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, communication channels 125, 145, 165, and 185 may be any number or combinations of communication channels supporting communication between clients 120 and the virtual machines instantiated on resources 180. It should be appreciated that communication channels 145 may be configured in any suitable manner. For example, a communication channel may be configured directly between switches 150-a and 150-b.

The network 130 may be any suitable network for facilitating communication between clients 120 and the virtual machines instantiated on resources 180. For example, network 130 may be any combination of: Local Area Network(s) (LAN), Wireless Local Area Network(s) (WLAN), Wide Area Network (WAN), Metropolitan Area Network (MAN), and/or the like.

The edge switches 140 and local switches 150 may be any number and any level of switches and/or routers suitable for routing application requests and responses between clients 120 and the virtual machines instantiated on resources 180. For example, though only two levels of switches are illustrated (e.g., edge switches 140 and local switches 150), the cloud network 100 may include additional switches. It should also be appreciated that although the switches are illustrated in a layered manner, any suitable network configuration sufficient to route application requests and responses may be used.

The storage arrays 160 store the application data and provide the storage services used by the virtual machines instantiated on resources 180. Storage arrays 160 may be any suitable storage device and may include any number of storage devices. The included storage device(s) may be similar or disparate and/or may be local to each other or geographically dispersed.

The resources 180 contain the resources which comprise the virtual machines created to service application requests. In particular, resources 180 may include one or more processors, one or more network interfaces, one or more memories and/or one or more data storage devices. Moreover, resources 180 may be any suitable physical hardware configuration such as: servers, blades consisting of components of the virtual machine such as processor, memory and/or network interfaces and/or storage devices (e.g., storage arrays 160). Virtual machines may include any suitable configuration of resources 180. For example, a virtual machine may include processing resources from one or more physical devices (e.g., 180-a and 180-d) and memory resources from one or more physical devices (e.g., 180-b and 180-c). Such physical devices may be local to each other or remote from each other. In some embodiments, the virtual machines will service an application request from one of clients 120 using application data stored in one of storage arrays 160.

It should be appreciated that the resources 180 may communicate with any number of storage arrays 160 over any suitable communication path. For example, VM 180-a may communicate with storage array 160-b via communication path: 185-a-145-d-145-c-165-b.

Figure 2:
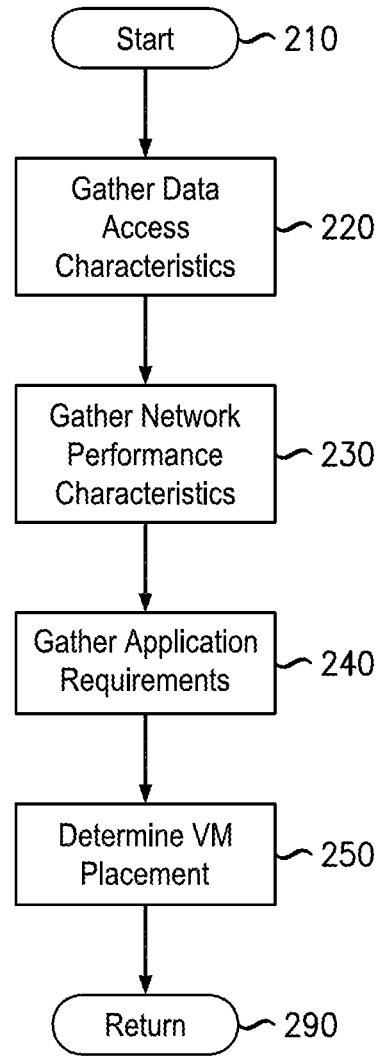
FIG. 2 depicts a flow chart illustrating an embodiment of a method for network and storage-aware virtual machine (VM) placement.

FIG. 2 depicts a flow chart illustrating an embodiment of a method for network and storage-aware virtual machine (VM) placement.

In the method 200, the step 220 includes gathering performance characteristics of the storage devices (e.g., storage communication channels 165 and/or storage arrays 160 of FIG. 1). In particular, characteristics regarding the storage device performance such as the data storage and access costs, latency of reads, latency of writes, available storage space, and/or fragmentation level, may be collected. For example, a write and/or read access delay the storage communication channels 165 may be gathered. In another example, the cost of storing data in the storage arrays 160 may be gathered.

It should be appreciated that storage devices may impact the performance of an application, especially in storage-intensive applications. As a result, by placing VMs based on characteristics regarding the storage device, the VM placement algorithms may increase performance.

In the method 200, the step 230 includes gathering network performance characteristics of the network (e.g., edge communication channels 145, local communication channels 185 and/or performance characteristics of the edge switches 140 and/or the local switches 150 of FIG. 1). In particular, performance characteristics regarding the network performance such as the access costs (e.g., bandwidth), processor latency, communication channel latency, and/or load balancing constraints. For example, an access delay of a packet traversing local communication channels 185 may be gathered The method 200 optionally includes step 240. Step 240 includes gathering application requirements. In particular, the requirements of the application and the topology of the various components of the application including information such as how many VMs are present, how they are connected, the data access pattern of the application and the service requirements of the application. For example, an application that is storage intensive will benefit if placed on a storage array that is relatively faster compared to other storage arrays.

It should be appreciated that application requirements may impact the performance of an application, especially in applications that are storage-intensive. As a result, by placing VMs based on application requirements, the VM placement algorithms may increase performance.

In the method 200, the step 250 includes determining placement of the virtual machine. In particular, placement of the virtual machine includes selecting the locations of the resources (e.g., resources 180) that constitute the virtual machine in the data center. Selection of the locations of the virtual machine resources is based on the characteristics regarding the storage device performance, the network performance characteristics and the application requirements.

In some embodiments, commercially available storage array drivers maintain performance characteristics of the storage devices (e.g., storage arrays 160 of FIG. 1) and expose this information via an API. In some of these embodiments, step 220 includes retrieving performance characteristics of at least a subset of the storage devices via the API.

In some embodiments, the step 230 includes gathering network performance characteristics at the granularity of each top of the rack switch (e.g., local switches 150). In a further embodiment, network performance characteristics are associated with the topology of the data center.

In some embodiments, network devices such as the local switches 150 of FIG. 1 provide network performance characteristics. In some of these embodiments, step 230 includes retrieving performance characteristics of at least a subset of the network devices via the commercially available interface(s). In some of these embodiments, real-time network performance characteristic is provided.

In some embodiments, the step 250 includes using conventional classical optimization techniques. Conventional classical optimization techniques involve determining the action that best achieves a desired goal or objective. An action that best achieves a goal or objective may be determined by maximizing or minimizing the value of an objective function. In some embodiments, the goal or metric of the objective function may be to minimize costs or to minimize application access delays.

The problem may be represented as:
Optimizing:

$$y = f(x_1, x_2, \ldots, x_n) \quad [\text{E.1}]$$

Subject to:

$$G_j(x_1, x_2, \ldots, x_n) \begin{Bmatrix} \leq \\ = \\ \geq \end{Bmatrix} b_j \quad [\text{E.2}]$$

$$j = 1, 2, \ldots m$$

Where the equation E.1 is the objective function and equation E.2 constitutes the set of constraints imposed on the solution. The $x_i$ variables, $x_1, x_2, \ldots, x_n$, represent the set of decision variables and $y=f(x_1, x_2, \ldots, x_n)$ is the objective function expressed in terms of these decision variables. It should be appreciated that the objective function may be maximized or minimized.

Referring to FIG. 1, in a first simple example, users are running a remote desktop application in the cloud. In this example, a user launches a VM, which is attached to a storage array that stores the user's file system mounted in the VM. The top-of-the-rack (ToR) switches (e.g., local switches 150) connect multiple physical machines (e.g., resources 180) on which the VMs run.

The VM machine placement method (e.g., method 200) will determine the placement of the VM based on the characteristics regarding the storage device performance, the network performance characteristics and the application requirements.

For this example, assume the following characteristics and constraints apply:
 1) a single resource (e.g., 180-a-180-f) and a single storage array (e.g., 160-a or 160-b) will constitute the instantiated VM;
 2) read latency over 165-a is 60 ms and over 165-b is 20 ms;
 3) write latency over 165-a is 80 ms and over 165-b is 120 ms;
 4) access latency 185-a-185-f is 20 ms, 20 ms, 15 ms, 25 ms, 30 ms and 30 ms respectfully;
 5) access latency over all of edge communication channels is 50 ms
 6) cost of storage on 160-a is $10/GB and on 160-b is $20/GB;
 7) bandwidth cost of read and write access on 165-a is $5/GB and on 165-b is $10/GB;
 8) bandwidth cost of read and write access on 185-a-185-f is $5/GB;
 9) cost of processor and network resources on 185-a-185-f is the same;
 10) both of storage arrays 160 has adequate storage capability; and
 11) the application requires 10 GB of data storage, 1 GB/month of bandwidth and services only read requests.

If the sole objective of this simple example requires minimizing access latency, the objective function depends on the decision variables regarding latency (e.g., constraints (2), (3), (4) and (5)). In this case, the function will determine to place the VM in resource 180-d and the storage data in storage array 160-b since the aggregate latency over the communication path 185-d-165-b is the lowest (i.e., 25 ms+20 ms=45 ms).

Comparing this placement with a VM placement strategy that only focuses on network performance characteristics, the VM placement of the method 200 advantageously leads to better result (45 ms as compared to 75 ms in this example). For example, in a placement strategy using the same constraints but focusing on network performance characteristics and ignoring the real-time latency of the data access, the VM will be placed in resource 180-*c* which has the lowest network access latency (i.e., 15 ms). However, the actual latency of this placement for a read access would be the latency over 185-*c* and over 165-*a* which would be 15 ms+60 ms=75 ms.

It should be appreciated that adding further constraints to this example may affect the output of the objective function. For example, adding application constraints:

$$\text{cost}(X) < \$25/\text{month}. \quad (12)$$

Adding constraint (12) changes the output of the objective function of method 200 to place the VM in resource 180-*c* since placing the VM in resource 180-*d* using storage array 165-*b* violates constraint (12). I.e., the monthly cost of $35 exceeds the $25/month cost constraint.

In some embodiments, the objective function may not be able to find any solution that satisfies the constraints. For example, adding yet another application constraint:

$$\text{latency}(X) < 50 \text{ ms}. \quad (13)$$

Adding constraint (13) creates an objective function where no output will satisfy the constraints. In some of these embodiments, a best fit may be chosen. In some of these embodiments, a message may be sent to the client notifying them that the VM will not satisfy all of the imposed constraints.

In some embodiments, the objective function may be optimized with an objective to minimize cost. In a further embodiment of these embodiments, performance constraints may be imposed to ensure that minimum performance levels are maintained.

In some embodiments, the objective function may be optimized to minimize and/or maximize a number of objectives/goals. For example, the objective function may weight the cost and latency outputs to determine the optimal VM placement for that weighted algorithm. In some of these embodiments, a weighted ranking will be determined and the VM placement with the highest or lowest weighted ranking will be chosen as the output. In some of these embodiments, the best fit will be based on the weighted ranking.

In some embodiments, the constraints may be based on load balancing decisions. In some of these embodiments, the latency of the processor in servicing a request may be determined.

In some embodiments, a physical location of a resource (e.g., resources 180) and/or storage array (e.g., storage arrays 160) may be a constraint on the objective function. For example, for compliance with regional technology export laws, a constraint such as: "resource(region)=United States" may be imposed upon the objective function. Where the variable "resource(region)" specifies that the resource must be located in the United States. In some of these embodiments, the physical location of the resource and/or storage array is gathered during step 220 and/or step 230 of FIG. 2. In a further embodiment of this embodiment, the physical location of the resource and/or storage array may be determined based on header information such as an IP address. In another of these embodiments, the physical location of the resource and/or storage array may be retrieved from remote storage and/or local storage. It should be appreciated that the gathered and/or retrieved information may be in any format that may be compared to the constraint. For example, GPS coordinates may be translated to determine that the GPS coordinates are in the United States.

It should be appreciated that the application access pattern may have an impact on the VM placement decision. For instance, in this example, if the application access pattern in (11), "services only read requests", was changed to "services only write requests", the placement decision changes from the original example (i.e., 180-*d*) to 180-*c* as the latency of the virtual machine with the resource combination 180-*c*/160-*a* is 95 ms and the latency of the virtual machine with the resource combination of 180-*d*/160-*b* is 140 ms.

In some embodiments, a subset of storage arrays 160 and/or resources 180 may be reserved for clients who have reserved a service level threshold. For example, via service level agreements (e.g., real-time applications requiring quality of service parameters) and/or via contracted resource agreements (e.g., resources 180 may be available to clients based on their contracted for level of service). In some of these embodiments, the reservation of the storage array and/or resource may be imposed via a constraint on the objective function. For example, the constraint may be: "resource≠180-*c*".

It should be appreciated that typically, the data in the cloud, is stored in storage arrays (e.g., storage arrays 160) attached to the ToR switches (e.g., local switches 150) and is backed up in multiple places. For example, the users' file system may be in storage array 160-*a* and backed up in storage array 160-*b*.

Although primarily depicted and described in a particular sequence, it should be appreciated that the steps shown in method 200 may be performed in any suitable sequence. For example, the steps 220, 230, and 240 may be performed in any order. Moreover, the steps identified by one step may also be performed in one or more other steps in the sequence and/or common actions of more than one step may be performed only once.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Figure 3:
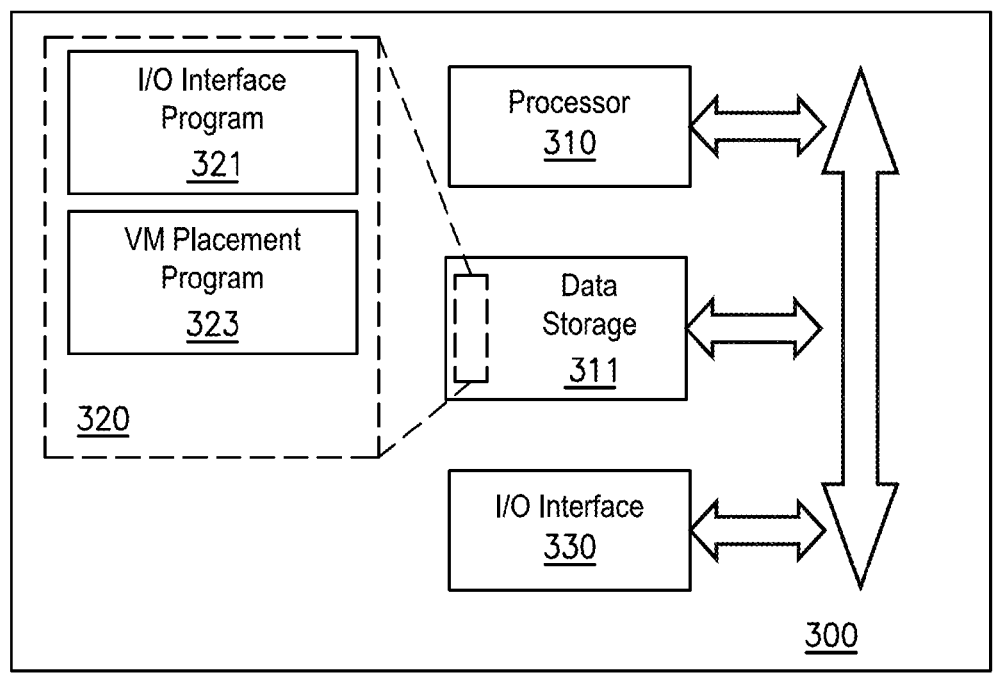
FIG. 3 schematically illustrates an embodiment of a VM placement apparatus.

FIG. 3 schematically illustrates an embodiment of a VM placement apparatus 300. The apparatus 300 includes a processor 310, a data storage 311, and an I/O interface 330.

The processor 310 controls the operation of the apparatus 300. The processor 310 cooperates with the data storage 311.

The data storage 311 may store program data such as gathered data access characteristics (e.g., from step 220 of FIG. 2), gathered network performance characteristics (e.g., from step 230 of FIG. 2), and/or gathered application requirements (e.g., from step 240 of FIG. 2). The data storage 311 also stores programs 320 executable by the processor 310.

The processor-executable programs 320 may include an I/O interface program 321, and a VM placement program 323. Processor 310 cooperates with processor-executable programs 320.

The I/O interface 330 cooperates with processor 310 and I/O interface program 321 to support communications over communications channels 145, 165 and/or 185 of FIG. 1 as described above (e.g., in retrieving the performance characteristics of the storage devices via an API in step 220 of FIG. 2 and retrieving the network performance characteristics in step 230 of FIG. 2).

The VM placement program 323 performs the steps of the method 200 of FIG. 2 as described above. In particular, the VM placement program gathers the characteristics regarding the storage device performance (e.g., step 220 of FIG. 2), gathers the network performance characteristics (e.g., step 230 of FIG. 2) and optionally gathers the application requirements (e.g., step 240) and then determines the location placement of the virtual machine based on the gathered data.

It should be appreciated that the VM placement program 323 may determine the location placement of the VM by selecting the resources (e.g., resources 180) and/or storage arrays (e.g., storage arrays 160) that comprise the virtual machine. It should be further appreciated that the VM placement apparatus 300 is not required to have an indication of the actual physical locations of devices in performing the determination of location placement.

In some embodiments, the apparatus 300 may be a portion of or all of one or more of resources 180. In other embodiments, the apparatus 300 may be an apparatus located outside of resources 180 such as a remote server. In some of these embodiments, the apparatus 300 may be located outside of the local switches 150.

In some embodiments, the apparatus 300 may be virtual machine. In some of these embodiments, the virtual machine may include components from different machines and/or be geographically dispersed. For example, the data storage 311 and the processor 310 may be in two different physical machines. In some of these embodiments, the virtual machine may include resources from resources 180 of FIG. 1.

When processor-executable programs 320 are implemented on a processor 310, the program code segments combine with the processor to provide a unique device that operates analogously to specific logic circuits.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively coupled to any suitable arrangement of devices; storing information in any suitable combination of memory(s), storage(s) and/or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus for providing placement of a virtual machine in a cloud network comprising a plurality of available resources, the apparatus comprising:
   a data storage;
   a memory; and
   a processor communicatively coupled to the data storage, the processor configured to:
      gather, in the data storage, a first set of storage performance data representing the performance characteristics of one or more storage arrays in the cloud network;
      gather, in the data storage, a second set of network performance data representing one or more network performance characteristics associated with a plurality of communication paths between ones of the storage arrays and ones of the available resources; and
      determine a placement location of the virtual machine in the cloud network based on the first set of storage performance data and the second set of network performance data;
   wherein the virtual machine comprises at least one of the one or more storage arrays and at least one of the plurality of available resources;
   wherein the plurality of communication paths comprises a first path between a first storage array and a first available resource and a second path between a second storage array and a second available resource;
wherein the first available resource and the second available resource are different; and
wherein the one or more storage arrays comprise the first storage array and second storage array and the plurality of available resources comprise the first available resource and the second available resource.

2. The apparatus of claim 1, wherein the apparatus further comprises:
an I/O interface communicatively coupled to the processor; and
wherein the processor is further configured to:
retrieve the first set of storage performance data via the I/O interface; and
retrieve the second set of network performance data via the I/O interface.

3. The apparatus of claim 2, wherein the retrieval of the first set of storage performance data comprises communicating with at least one storage device of the one or more storage arrays via an API.

4. The apparatus of claim 1, wherein the determination of the placement location is based on an optimization objective function and one or more constraints.

5. The apparatus of claim 4, wherein the optimization objective function minimizes a cost output.

6. The apparatus of claim 4, wherein the optimization objective function is based on a weighted ranking of a plurality of objectives.

7. The apparatus of claim 1, wherein the processor is further configured to:
gather, in the data storage, a third set of application requirement data representing one or more application requirements of the virtual machine; and
further base the determination of the placement location on the third set of application requirement data.

8. The apparatus of claim 7, wherein the third set of application requirement data comprises a data access pattern.

9. A virtual machine placement system for providing placement of a virtual machine in a cloud network comprising a plurality of available resources, the system comprising:
a plurality of storage arrays;
a plurality of resources comprising a memory; and
a virtual machine placement apparatus communicatively coupled to the plurality of storage arrays and the plurality of resources, the virtual machine placement apparatus being configured to:
gather a first set of storage performance data representing the performance characteristics of the plurality of storage arrays;
gather a second set of network performance data representing one or more network performance characteristics associated with a plurality of communication paths between ones of the storage arrays and ones of the available resources; and
determine a virtual machine based on the first set of storage performance data and the second set of network performance data, the virtual machine comprising at least one of the plurality of storage arrays and at least one of the plurality of resources;
wherein the virtual machine comprises at least one of the one or more storage arrays and at least one of the plurality of available resources;
wherein the plurality of communication paths comprises a first path between a first storage array and a first available resource and a second path between a second storage array and a second available resource;
wherein the first available resource and the second available resource are different; and
wherein the one or more storage arrays comprise the first storage array and second storage array and the plurality of available resources comprise the first available resource and the second available resource.

10. The system of claim 9, wherein the determination of the virtual machine is based on an optimization objective function and one or more constraints.

11. The apparatus of claim 10, wherein the optimization objective function minimizes cost output.

12. The apparatus of claim 10, wherein the optimization objective function is based on a weighted ranking of a plurality of objectives.

13. The system of claim 9, wherein the virtual machine placement apparatus is further configured to:
gather a third set of application requirement data representing one or more application requirements of the virtual machine; and
further base the determination of the virtual machine on the third set of application requirement data.

14. A method for providing placement of a virtual machine in a cloud network comprising a plurality of available resources, the method comprising:
at a processor communicatively coupled to a data storage, gathering, in the data storage, a first set of storage performance data representing the performance characteristics of one or more storage arrays in the cloud network;
gathering, in the data storage, a second set of network performance data representing one or more network performance associated with a plurality of communication paths between ones of the storage arrays and ones of the available resources; and
determining, by the processor in cooperation with the data storage, a placement location of the virtual machine in the cloud network based on the first set of storage performance data and
the second set of network performance data;
wherein the virtual machine comprises at least one of the one or more storage arrays and at least one of the plurality of available resources;
wherein the plurality of communication paths comprises a first path between a first storage array and a first available resource and a second path between a second storage array and a second available resource;
wherein the first available resource and the second available resource are different; and
wherein the one or more storage arrays comprise the first storage array and second storage array and the plurality of available resources comprise the first available resource and the second available resource.

15. The method of claim 14, wherein the step of determining the placement location is based on an optimization objective function and one or more constraints.

16. The method of claim 15, wherein the optimization objective function minimizes a cost output.

17. The method of claim 15, wherein the optimization objective function is based on a weighted ranking of a plurality of objectives.

18. The method of claim 14 further comprising:
gathering, in the data storage, a third set of application requirement data representing one or more application requirements of the virtual machine; and
further basing the step of determining the placement location on the third set of application requirement data.

19. The method of claim 18, wherein the third set of application requirement data comprises a data access pattern.

20. The method of claim 14 further comprising:
further basing the step of determining the placement location on a reservation constraint.

21. The method of claim 15 further comprising:
sending a client notification in response to determining that the placement location does not satisfy the one or more constraints of the optimization objective function.

22. The apparatus of claim 1 wherein the second set of network performance data comprises a plurality of latencies associated with a plurality of the plurality of communication paths.

23. The apparatus of claim 22 wherein the plurality of latencies comprise a plurality of read latencies and a plurality of write latencies.

24. The apparatus of claim 22, wherein the determination of the placement location is based on minimizing at least one of the plurality of latencies.

25. The apparatus of claim 1, wherein the first storage array and the second storage array are different.

\* \* \* \* \*